United States Patent Office 3,332,770
Patented July 25, 1967

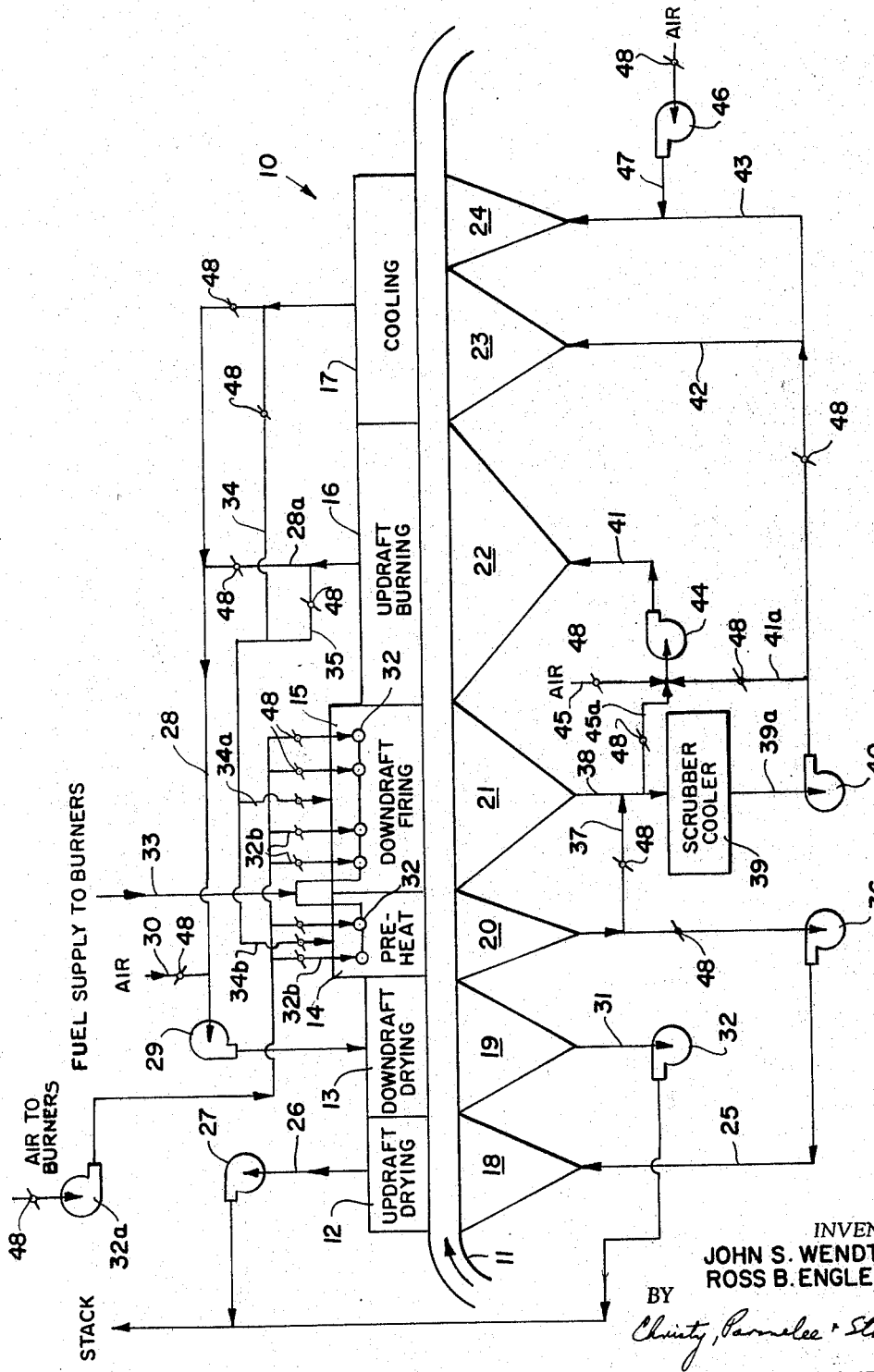

3,332,770
APPARATUS FOR REDUCTION FIRING OF IRON
ORE PELLETS
John S. Wendt, Jr., Sewickley Heights, and Ross B. Engleman, Allison Park, Pa., assignors to Dravo Corporation, Pittsburgh, Pa., a corporation of Pennsylvania
Filed Apr. 1, 1965, Ser. No. 444,694
20 Claims. (Cl. 75—5)

ABSTRACT OF THE DISCLOSURE

Briefly the invention embodies mixing finely-divided solid fuel with oxidic iron ore, forming the mix into pellets, and coating the pellets with additional finely-divided solid fuel. The pellets are then subjected to drying and preheating steps, and then exposed to hot oxidizing gas and the surface coating of fuel on the pellet is ignited. Under these conditions the temperature of the pellets is increased to a level where a reducing reaction takes place inside the pellet between the carbon and oxygen in the ore to reduce the oxide within the pellet. Exposure to oxidizing gas is terminated before substantial reoxidation can take place. The gases produced from this procedure are substantially non-oxidizing and are desirably used to cool the hot pellets. Carrying the procedure out on a pelletizing grate, the pellets are formed into a bed on the grate, the hot oxidizing gases first pass through the grate and bed of pellets in one direction whereby the oxygen is exhausted as the combustion of fuel progresses through the bed, and before substantial reoxidation of the pellets first encountered by the oxidizing gases can take place, the direction of flow of the oxidizing gas is reversed to then burn the surface coating of fuel on the pellets from the opposite direction with oxygen-starved gases then passing through the pellets which were first reduced.

---

This invention relates to the pelletizing and processing of iron ore, and is for a method of and apparatus for the production of pellets formed from oxidic iron ore in which a substantial amount of the ore content of the pellets is directly reduced to metal during the firing of the pellets. Unlike usual smelting procedures where the iron is removed as a molten liquid, the reduction of the ore occurs by what may be termed a solid state reduction, in that, except for shrinkage, the pellets retain their initial form and identity.

The preparation of iron ore, both magnetite and hematite, by comminuting it to fine particle size and then forming it into green pellets and then heat-hardening the pellets, either on a traveling grate, shaft furnace, or in some cases by apparatus embodying a rotary kiln, is extensively practiced in ore preparation processes. Various procedures have heretofore been proposed to effect a reduction of a substantial amount of the iron oxide content of the pellets to iron during the firing or heat-hardening process, but so far as we are aware, they have not been employed commercially with any substantial degree of success, if at all.

The reduction of iron ore to metal is ordinarily effected by bringing the ore and a carbonaceous reducing agent, such as coke or coal, together at a high temperature whereby oxygen from the iron oxide combines with the carbon to produce carbon monoxide. This is an endothermic reaction which can be sustained only as long as heat is supplied from some external source. On the other hand, metallic iron at this temperature will readily combine with oxygen to again convert the iron to an oxide. Hence firing of the pellets must be effected to accomplish the reduction of the oxide to metallic iron and prevent subsequent reoxidation.

An apparatus of the type utilizing a traveling grate in which the grate, generally comprised of a continuous progression of pallets movable over a series of windboxes and under gas-confining hoods, has been extensively used in the firing or heat-hardening of pellets, but is economical only if the bed of pellets on the grate can be of a depth such as to yield a high daily output of pellets.

The present invention provides modification of such a traveling grate machine whereby it may be used for the production of pellets in which a substantial amount of the iron oxide is directly reduced in the pellet while maintaining the depth of the bed of pellets deep enough to provide an economically satisfactory yield, and at the same time control the firing in such manner as to preclude the reoxidation of the reduced pellets.

Our invention has a further object to provide a novel method of preparing and firing the pellets to secure direct reduction of the ore and prevent the subsequent oxidation of the metal.

Generally in the preferred embodiment of our invention, pellets are prepared by mixing with the ore, before it is formed into pellets, a reducing agent, such as a finely-divided solid fossil fuel, and providing on the exterior of the pellets a coating of readily oxidizable fuel. Pellets so prepared are then placed on the traveling grate machine, and after first passing through a drying zone, are next moved to a pre-heating zone where they are preheated with gases containing controlled amounts of oxygen, and then to a downdraft firing zone where the remaining fuel on the pellets in the upper portion only of the bed is burned to maintain the temperature of the pellets at a level where reduction of the oxide to iron takes place, but oxygen-poor gases are moved down through the intermediate and lower levels of the bed to further heat them. The traveling grate then carries the pellets to an updraft firing zone where exhaust gases from the heating and top firing zone, a portion of which may be scrubbed and cooled, along with controlled air, flow updraft through the already heated pellets in the lower level of the bed, burning the fuel coating on the surface thereof and boosting their temperature to effect reduction of iron ore within the pellets and the resulting hot oxygen-poor gases from the burning flow upward through the bed, further heating the pellets in the middle of the bed, and effecting reduction of the iron in the pellets in the bottom and middle layers of the bed.

Scrubbed and cooled exhaust gases from the preheating and top firing windboxes not used in the updraft firing stage are blown updraft through the pellets in the cooling zone. Heat from these gases is recuperated in the preheating and top firing zones.

Further details and advantages will appear from the following description in conjunction with the accompanying drawing, in which:

The figure on the drawing is a schematic illustration of a traveling grate machine modified according to the invention for carrying out the process of the invention.

Referring to the drawing, the traveling grate machine 10 is comprised of an endless progression of pallets which form a traveling grate or conveyor 11 for advancing the pellets through the machine. There are a succession of hoods 12–17 over the grate which are sealed to a succession of windwox sections 18–24 below the grate, it being understood that the drawings are schematic, and that each windbox section in the drawings will comprise a plurality of individual windboxes as will be understood by those skilled in the art. The machine is divided into functional zones according to the legends, i.e., a drying zone which would usually have a downdraft section and which may optionally have an updraft section in advance of the downdraft drying section, and such arrangement is here shown. There follow in order, preheating, downdraft firing, updraft firing, and cooling zones. Each zone has a hood and corresponding windboxes. The cooling zone may optionally have two windbox sections 23 and 24 for a purpose explained later.

In the updraft drying zone gases are introduced to the windbox 18 from duct or line 25 and exhausted from the hood 12 to a stack via line 26 by an exhaust fan or blower 27. Downdraft drying hood 13 is supplied with heated drying gases from hoods 16 and 17 by ducts 28 and 28a and blower 29 in the line 28. An air inlet line 30 is connected to line 28 upstream of blower 29. Windbox 19 is connected to an exhaust line 31 for exhausting gases to a stack by means of a blower 32. Positioned under hoods 14 and 15 there is a series of fuel burners 32 supplied with primary combustion air through line 33. Combustion air is suppleid to the burners 32 by blower 32a and lines 32b. Additional heated gases are supplied to the hoods 14 and 15 from the hoods 16 and 17 via lines 34 and 35 and branch lines 34a and 34b. Windbox section 20 under the preheating hood 14 is connected to supply some of the gases therefrom to windbox 18 for updraft drying through line 25 having a blower 36 therein.

Cross-connecting line 37 connects line 25 to duct 38 leading from windbox area 21 under the downdraft firing zone. Duct 38 connects with the intake of a scrubber-cooler 39 and thence through a discharge duct 39a to a blower 40, which supplies cooled gases to windboxes 23 and 24 of the first and second cooling stages respectively via lines 42 and 43. Line 41 to windbox 22 in the updraft firing zone carries a selected mixture of gases from blower 44, which mixture may comprise gases from scrubber-cooler 39 via line 39a, blower 40 and line 41a, gases from downdraft firing windbox 21 via line 38 and scrubber-cooler by-pass line 45a, and air through line 45. Blower 46 discharges air into line 43 through air inlet line 47. 48 are dampers in the various lines for regulating or proportioning the flow of gases therethrough. The arrow in the lines indicate the direction of flow of gases in the various lines.

The operation of the apparatus will be more completely described in connection with the following description of the process of the invention.

The pellets are comprised of oxidic iron ore fines such as hematite or magnetite, intimately admixed with a finely-divided carbonaceous fuel or reducing agent, such as coke breeze, char, anthracite, bituminous coal, lignite or combinations thereof. The ore concentrate is ground to 60% or more of −325 mesh. A typical ore concentrate may contain about 60 to 70% iron. The carbonaceous fuel is ground to a fineness of about 100 to 200 mesh and thoroughly mixed with the ore along with water and a binder, such as Bentonite. The resulting mixture contains iron ore, fuel in the preferred range of about 12 to 25% by weight of the ore, water of about 8 to 12% by weight of the ore, and a binder of about 0–1% by weight of ore. This mixture is then balled or pelletized in a suitable balling or pelletizing apparatus of a conventional type (not shown). The pellets are then rolled in carbonaceous fuel fines to add an external coating of fuel. The pellets thus formed contain external fuel of about 2 to 10% by weight of the ore in addition to the internal fuel. Preferably the pellets are about ½- to ¾-inch diameter before the external fuel is added. The coating fuel prevents oxidation of the pellets and provides additional sensible heat during the reduction process. The coated pellets are then distributed onto the traveling grate 11 to a uniform depth, which may be in a range of about 3 to 12 inches. The pellet bed therefore is several pellets deep and may be conveniently regarded as comprising top, middle and lower layers or levels of approximately equal depth.

The pellets are first dried in the drying zones which are here illustrated as updraft followed by downdraft, which is the desired arrangement when treating deeper beds of the order of 7 to 12 inches, for example. For shallower beds the updraft drying may be eliminated. With downdraft drying only, condensation may form on the pellets at the lower levels of the deeper beds and soften the pellets in the lower level to a point where they may be mashed or crushed by the weight of the upper levels, for which reason updraft followed by downdraft drying is preferred for the deeper beds.

Gases for updraft drying are derived from the windbox 20 in the peheating stage and are exhausted to a stack after passing through the bed. Gases for downdraft drying comprise a selected mixture of gases derived from the hoods 16 and 17 and atmospheric air from line 30, and after passing through the bed are exhausted to a stack. Temperatures of the drying gases are moderate, being of the order of about 400 to 800° F. so as to be substantially non-oxidizing. The air mixed with the off-gases from hoods 16 and 17 tempers and cools the downdraft drying gases before they enter the blower 29 and enter the hood 13 for passage downwardly through the bed of pellets. At this temperature the fuel coating on the pellets is not ignited.

Leaving the drying zones, the grate advances the pellet bed to the downdraft preheating and firing zones. Both zones are provided with burners 32, preferably gas or oil burners. Combustion air is supplied by blower 32a to the burners 32 via branch lines 32b. Preheated gases from the hoods 16 and 17 over the updraft firing and cooling zones are carried through duct 34 and hood supply lines 34a and 34b to the hoods 14 and 15. These preheated gases not only recuperate heat but supply additional oxygen for mixing with the combustion gases from the burners. In the pre-heating zone the burners 32 are operated to effect a rapid heating of the pellets, particularly in the uppermost pellets, and additional air is supplied to effect the combustion of the surface fuel in the upper pellets whereby heating occurs not only by convection but by radiation from the burning of the coating fuel which is an exothermic reaction. As the pellets become heated above 2000° F., and preferably to about 2150–2300° F., to closely approach the melting point of the sponge iron, a rapid endothermic reducing reaction occurs between the internal fuel and oxides in the pellets. This would cool the pellets except for the heat added by the combustion of fuel in the burners and the combustion of the coating fuel. Heat is carried by the flow of gases downwardly into the bed of pellets, heating the intermediate and lower levels. As the fuel burns away from the topmost pellets in the preheating zone, the pellets are moved by the traveling grate into a downdraft firing zone in which down-flowing gases are adjusted to deliver less free oxygen. The residual fuel on the exterior of the topmost pellets is slowly burned away to maintain the endothermic reducing reaction within the pellets. The pellets are protected from substantial reoxidation by the remaining coating fuel and by the reduced oxygen content of the downdraft gases which lowers the burning rate of the remaining coating fuel. At the same time heat is carried from the top layer of pellets into the underlying pellets and oxidation of the coating fuel on pellets in the upper part of the intermediate level occurs, heating these pellets to a temperature where the rapid endothermic reducing reaction takes place, while heat is carried further into the lower levels. As the fuel coating on these pellets is consumed, the endothermic reaction progresses and heat is carried down into the bed to further heat the pellets therein. The pellets in the lower levels will now have been heated to a temperature of about 1400 to 2000° F. as the traveling grate advances the pellets into the updraft firing zone. Here updraft gases at a temperature of about 600° F., derived from the windboxes of the downdraft preheating and firing zones and containing CO from the endothermic reduction of iron ore with carbon, $CO_2$, nitrogen, and air admitted through inlet 45, contact the hot bottom pellets, igniting the CO and burning the coating fuel on these pellets, the heat passing upwardly through the bed. The lowermost pellets first reach a reducing temperature and by the resulting endothermic reaction and the flow of incoming gases, are subsequently surface-cooled as the coating fuel is consumed to prevent reoxidation and the same steps of firing and reducing occur further up in the bed while further heating the previously partially reduced intermediate levels of pellets.

In the downdraft pre-heating zone with a pellet bed on the order of about 8 to 12 inches, the combustion gases and air are on the order of about 2200 to 2600° F. With a gas flow rate of about 250 s.c.f.m. per square foot of grate area, the total downdraft pre-heating and firing time is about 7 to 12 minutes, however, the oxygen level is reduced in the firing zone as before explained. These factors may vary according to ore composition, pellet size, character of fuel and the water vapor and CO content of the gases in the various zones.

In the updraft firing zone, off-gases from the pre-heating zone windbox 20 which are not used for updraft drying as before explained, are passed through cross-connecting line 37 to line 38 where they are mixed with exhaust gases from the downdraft firing zone windbox 21, which gases now include CO. These gases may be divided and a portion thereof passed through scrubber-cooler 39 and circulated to the updraft firing and cooling zones. Another portion of the gases from downdrift firing may by-pass the scrubber-cooler 39 through by-pass line 45a to the suction side of fan 44 where the by-passed gases are mixed with scrubbed and cooled gases from duct 41a and air from line 45. The fan 44 discharges the mixed gases into line 41 to the windboxes 22 of the updraft firing zone. The cooling of a portion of the downdraft firing gases prevents premature ignition of the CO therein when air is mixed therewith. The resulting gas mixture entering the windbox 22 is at a temperature up to about 600° F. and contains a controlled amount of oxygen from the addition of air from line 45.

The atmospheric air provides the oxygen necessary for combustion of CO and the coating fuel in the lower level, because the gases from the downdraft pre-heating and firing zones are poor in oxygen, having once passed through the pellet bed. The gases to the updraft firing zone contain a small amount of water vapor, a variable small percentage of oxygen, up to about 8% carbon monoxide along with carbon dioxide and nitrogen, and the subsequently added air provides oxygen for burning CO to $CO_2$. The pellets are treated in the updraft firing zone for about 7–12 minutes with a gas flow rate of about 50 to 200 s.c.f.m. per square foot of grate area. This rate is lower than the downdraft firing rate because all of the pellets entering this zone have been highly preheated as hereinbefore explained. The oxygen level may be increased by the addition of atmospheric air to as much as about 12% of the total mixture entering the bed. Also the lower rate of flow minimizes the possibility of oxygen reaching the uper levels, preventing reoxidation of those pellets whose coating fuel has been consumed. Further protection from re-oxidation is provided by the fact that sufficient internal fuel remains in the upper level pellets to continue reacting with the ore oxides to evolve carbon monoxide which envelops the pellets in a protective atmosphere. Off-gases from the hood 16 of the updraft firing zone are divided and a portion thereof passes to the downdraft preheating and firing zones. Another portion of these exhaust gases may be passed to the hood 13 of the downdraft drying zone through line 28 and blower 29 as aforesaid.

While the intermediate levels of pellets may have attained a firing temperature slightly below the preferred 2150 to 2300° F. firing temperature of the uppermost and lowermost layers of pellets, these pellets have experienced the slightly lower temperature for a longer period of time and consequently have been reduced to essentially the same extent as the uper and lower layers by the time the bed leaves the updraft firing zone.

The pellets are next advanced to the cooling zone where gases are introduced to the windboxes 23 and 24 and collected in a common hood 17. Windbox 23 is supplied with a portion of the gases from the scrubber and cooler 39 through line 42. These gases contain a small quantity of water vapor, a variable small percentage of oxygen, up to about 7% carbon monoxide, about 10–12% carbon dioxide, and the balance nitrogen, which composition is essentially non-oxidizing at a flow rate of about 200–300 s.c.f.m. per square foot of grate area and a typical gas temperature of about 100 to 150° F. The windbox 24 receives another portion of the gases from scrubber and cooler 39 through line 43, mixed with controlled amounts of atmospheric air from line 47 and blower 46. The gases passed through the bed at a flow rate of about 400–600 s.c.f.m. per square foot of grate area are essentially non-oxidizing to the pellets which have been substantially cooled in the first stage cooling to a level where exposure to air will no longer oxidize the iron. Total time in the cooling zone is about 6 minutes at the above flow rates and gas composition. A portion of the gases collected in the hood 17 are re-circulated to the burner 32 in the downdraft preheating and firing zones through line 34, and another portion is recirculated to the downdraft drying zone through duct 28.

The pellets are finally discharged from the traveling grate to a suitable container or conveyor (not shown) for later use in a blast furnace or other conversion furnace as desired. The final pellet product has been reduced by the process to the extent that 50–95% of the original combined oxygen is removed from the iron oxides.

Further understanding of the invention may be gained by a fuller explanation and recapitulation of the heating and cooling cycles occuring in the pellet bed. In the pre-heating zone the gases passing through the bed are the hottest and the highest in oxygen. The temperature of the uppermost layer of pellets rises sharply to their maximum temperature by the exothermic reaction of the coating fuel and oxygen while the pellets below that level rise less sharply so that they reach their highest temperature at a later time. Most of the coating fuel on the upper level pellets is burned off in the pre-heating zone and the heat generated thereby is carried to the lower level pellets by the heated and now oxygen-poor gases. When the pellets enter the downdraft firing zone the oxygen level of the gases is reduced and the uppermost layer of pellets is maintained at reducing temperature. The heat carried off from these pellets is carried to the lower levels of pellets so that the pellets just below the topmost layer reach their maximum temperatures in the first portion of the downdraft firing. In the succeeding portion of the downdraft firing zone the gases entering the bed are further reduced in oxygen content, thereby minimizing the reoxidation of the topmost pellets and the subjacent pellets whose coating fuel has been substantially completely burned by this time. The heat carried from these pellets further heats the lower levels of the bed as the pellets advance into the updraft firing zone. The oxygen level of the gases is again increased for updraft firing in order to burn the coating fuel on the lowermost pellets raising them to their maximum temperature, and the combustion gases from the oxidation of the coating fuel pass upwardly to further heat the superjacent pellets and further heating the pellets in the upper levels whose coating fuel has been consumed. As the pellets progress through this zone, the lowermost pellets begin to cool and heat therefrom is carried to the superjacent pellets to complete the burning of their remaining coating fuel and further re-heating the upper levels to about their maximum temperature previously attained. As the pellets progress into the cooling zone the cooling continues on the lowermost levels and progresses upwardly through the bed cooling the next higher level and finally cooling the upper levels. These temperature cycles are effected primarily by modulating the oxygen content of the gases in the pre-heating, downdraft, and updraft firing zones to control the combustion of the coating fuel an dat the same time maintaining an atmosphere which minimizes reoxidation of the reduced pellets.

Our invention provides a method and apparatus wherein iron ore pellets are not merely hardened on a traveling grate apparatus, but wherein a substantial portion of the ore is reduced to a metallic state, effecting an overall economy in cost in converting ore to finished metal. In the process of firing the pellets, advantage is taken in the updraft firing of CO produced in downdraft firing, and the recuperation of heat from the updraft firing and cooling of the pellets is secured in the downdraft drying, preheating and firing stages.

The pellets lose volume by shrinkage during firing, conserving shipping space where ore is pelletized near the mine and remote from the blast furnace or other furnace where they are eventually used, and shipping weight per ton of finished iron is reduced over the shipping weight per ton of finished iron where the ore is in the form of unreduced pellets. Other economies recognized by those skilled in the art are effected by so processing the ore.

The pellets may be larger or smaller than the sizes herein described, but the herein-specified sizes are in the optimum range for the practice of the method, since they are small enough to be rapidly processed on the traveling grate, but large enough to avoid excessive reoxidation. However, for uniform results, the process is best carried out with the bed of substantially uniform depth and the pellets in the bed being fairly close to a uniform size.

While we have shown and described a preferred embodiment of an apparatus for practicing our invention and the method for reduction firing of the pellets, the invention is not restricted thereto and various changes and modifications may be made therein within the contemplation of our invention and under the scope of the following claims.

We claim:

1. A process for the beneficiation of finely-divided oxidic iron ores, comprising:
   (a) mixing the finely-divided ore with a carbonaceous fuel,
   (b) forming pellets of the ore and fuel mixture and providing a surface coating of such fuel over the pellets,
   (c) introducing the pellets onto a gas-penetrable supporting structure to form a pellet bed of substantially uniform depth, and first drying and preheating the pellets by passing heated gases therethrough
   (d) then flowing heated oxidizing gases transversely of its depth through the bed in one direction to burn the surface fuel on the pellets and effect an oxide-reducing reaction between the fuel and iron oxide mixed through the pellets with the reaction progressing through the bed of pellets in the direction of the gas flow,
   (e) discontinuing said gas flow before the reducing reaction has progressed beyond the middle level of the bed and before significant reoxidation of the pellets first contacted by the gases occurs, while the pellets most remote in a transverse direction from the pellets first contacted are raised to an elevated temperature but the surface coating of fuel thereon remains unburned,
   (f) reversing the flow of oxidizing gases through the bed to effect oxidation of the unburned fuel on the pellets and simultaneously effect reduction progressively in a reverse direction of the remaining pellets, and
   (g) cooling the pellets.

2. A process for the beneficiation of finely-divided oxidic iron ores, comprising:
   (a) mixing the finely-divided ore with a finely-divided solid carbonaceous fuel to provide a reducing agent in the mix,
   (b) forming pellets of the ore and fuel mixture,
   (c) coating the pellets with a finely-divided solid carbonaceous fuel,
   (d) depositing the coated pellets to a bed of substantially uniform depth onto the grate of a traveling grate machine having a succession of hoods above the grate and windboxes below the grate, the machine having drying, firing and cooling zones,
   (e) advancing the pellets through the several zones and, while so advancing them, successively
      (1) drying the pellets with heated gases,
      (2) firing the pellets by flowing hot gases downdraft through the bed to effect an oxide-reducing reaction between the fuel and oxygen in the upper layer of pellets in said bed and heating the pellets,
      (3) and then firing the pellets by flowing oxygen-containing gases updraft through the heated pellets in the lower layer of the bed to effect an oxide-reducing reaction between the fuel and oxygen in the bottom layer of pellets,
   (f) during each of the updraft and downdraft firings, controlling the oxygen content of the gases to a level such that the gases are oxidizing to the coating fuel on the pellets in the layer first contacted but substantially non-oxidizing to the pellets in the layer last contacted, and
   (g) finally cooling the pellets.

3. The process of claim 2 wherein the weight of the fuel mixed with the finely-divided ore comprises about 12% to 25% of the weight of ore and the coating fuel comprises about 2% to 10% of the weight of the ore.

4. The process of claim 2 wherein the coated pellets deposited onto the grate comprise finely-divided oxidic iron containing 60–70% iron, finely-divided carbonaceous fuel mixed with the ore in an amount of about 12%–25% of the weight of the ore, coating fuel in an amount of about 2%–10% of the weight of the ore, water of about 8% to 12% of the weight of the ore.

5. A process for the beneficiation of finely-divided oxidic iron ores in a traveling grate machine having a succession of hoods above the grate and windboxes below the grate, comprising:
   (a) mixing the finely-divided ore with a carbonaceous fuel,
   (b) forming pellets of the ore and fuel mixture,
   (c) coating the pellets with a carbonaceous fuel,
   (d) depositing the coated pellets onto the traveling grate to form a pellet bed of substantially uniform depth,
   (e) drying the pellets by a downdraft of heated gases therethrough,
   (f) preheating and firing the pellets by a downdraft of heated gases to effect a reduction of iron oxide to iron in some of the uppermost pellets of the bed and heating the remainder of the pellets,
   (g) updraft firing the pellets to reduce the remaining pellets, and
   (h) cooling the pellets.

6. The process of claim 5 including the updraft drying of the pellets before the downdraft drying step.

7. The process of claim 5 wherein the pellets in the top and bottom levels are heated during firing to a temperature of about 2150 to 2300° F.

8. A process for the beneficiation of finely-divided oxidic iron ore in a traveling grate machine having a traveling grate with hoods over the grate and windboxes under the grate arranged to provide in succession a drying zone, a downdraft firing zone, an updraft firing zone, an updraft cooling zone and means for selectively transferring gases from one zone to another, comprising:
(a) mixing the finely-divided ore with a carbonaceous fuel,
(b) forming pellets of the ore and fuel mixture,
(c) coating the pellets with a carbonaceous fuel,
(d) depositing the coated pellets onto the traveling grate to a substantially uniform depth,
(e) drying the pellets with a downdraft of heated gases derived at least in part from gases which have first passed updraft through the cooling zone,
(f) firing the pellets with a downdraft of gases including combustion gases from the burning of fuel in the downdraft firing zone to heat all of the pellets and effect reduction of iron oxide in the uppermost layer of pellets of said bed,
(g) firing the pellets updraft with windbox gases transferred from windboxes of the downdraft firing zone and added atmospheric air, reducing iron oxide in the pellets in the lower portion of said bed, and
(h) cooling the pellets updraft with cooled gases from the windboxes of the downdraft firing zone and added atmospheric air.

9. The process of claim 8 wherein at least a part of the gases transferred from the downdraft firing zone to the updraft firing and cooling zones are cooled before atmospheric air is added thereto to thereby preclude combustion of CO in said gases before they contact the lowermost pellets of the bed.

10. A process for the beneficiation of finely-divided oxidic iron ore in a traveling grate machine having updraft and downdraft drying zones, downdraft preheating and firing zones, an updraft firing zone, an updraft cooling zone, a fuel burner in the downdraft preheating and firing zones, each zone having a hood above the grate and windboxes below the grate, and means for selectively transferring gases from one zone to another, comprising:
(a) mixing the finely-divided ore with a carbonaceous fuel,
(b) forming pellets of the ore and fuel mixture,
(c) coating the pellets with a carbonaceous fuel,
(d) depositing the coated pellets onto the traveling grate to a substantially uniform depth,
(e) drying the pellets with an updraft of substantially heated gases transferred from the windboxes in the preheating zone,
(f) further drying the pellets with a downdraft of substantially heated gases transferred from the hood of the cooling zone,
(g) preheating and firing the pellets downdraft with heated gases from the burning of fuel in the hoods of the preheating and downdraft firing zones and by heated gases from the hoods of the updraft firing and cooling zones,
(h) firing the pellets updraft with gases transferred from the windboxes in the downdraft firing zone to the windboxes in the updraft firing zone,
(i) cooling the pellets updraft with gases transferred from the windboxes of the downdraft firing zone to the windboxes of the updraft cooling zone and mixed with air.

11. The process of claim 10 including cooling at least some of the gases transferred from the downdraft firing zone to the updraft firing zone and mixing the cooled gases with air before entering the updraft firing zone.

12. The process of claim 10 wherein the downdraft drying gases include gases transferred from the hood of the updraft firing zone.

13. The method of forming iron pellets from finely-divided oxidic iron ore comprising:
(a) mixing finely-divided iron ore with a finely-divided carbonaceous solid reducing agent,
(b) forming said mix into pellets,
(c) coating the pellets with finely-divided carbonaceous fuel,
(d) heating the pellets by convection with heated gases,
(e) continuing heating with oxygen-containing gases to burn the carbonaceous external fuel coating to raise the temperature of the pellets to at least about 2100° F. and simultaneously effect the reduction of iron oxide within the pellets by reaction of the carbonaceous fuel mixed through the pellets with oxygen in the oxidic iron ore with the release therefrom of carbon monoxide and the generation of non-oxidizing gases,
(f) and utilizing the gases so produced for cooling the pellets in a non-oxidizing atmosphere.

14. The method defined in claim 13 in which the pellets are disposed in a horizontal bed of substantially uniform depth and the convection heating and combustion of the coating fuel are first effected by the downdraft of the gases therethrough to effect the reduction reaction in the pellets in the upper level of the bed during which time pellets in the lower part of the bed are heated, terminating such downdraft flow of gases before the reduction reaction has progressed through the bed and then flowing gases derived from the downdraft firing and containing carbon monoxide upwardly through the bed along with added air to effect the reducing reaction from the bottom of the bed upwardly.

15. Apparatus for the firing of iron ore pellets to effect a reduction of iron oxide to iron during the firing and where the pellets are formed with carbon mixed with the ore and also coated with carbon, comprising:
(a) a traveling grate machine with a succession of windboxes below the traveling grate and hoods over the grate, said machine having an entering end and a discharge end, said hoods and windboxes being arranged to provide in succession from the entering end a drying zone, a downdraft heating and firing zone, an updraft firing zone and a cooling zone.
(b) fuel burners in the hoods for the downdraft heating and firing zones,
(c) means for transferring some of the gases from the windboxes of the firing zone to the cooling zone, said means including a gas cooler with input and outflow ducts through which said flow is directed,
(d) means for conducting some of the gases from the windboxes from the downdraft firing zone to the windboxes of the updraft firing zone,
(e) and means for conducting gases from the hoods of the updraft firing and cooling zones to the hoods of the heating and downdraft firing zones to provide therein heated gases of low oxygen content.

16. Apparatus as defined in claim 15 wherein said means for transferring gases from the windboxes of the downdraft firing zone comprises a duct connected with the outflow duct of the cooler.

17. Apparatus as defined in claim 15 wherein said means for transferring gases from the windboxes of the downdraft firing zone to the updraft firing zone comprises a duct connected with the outflow duct of the cooler, and means for introducing a controlled supply of air into said duct.

18. Apparatus as defined in claim 15, including means for transferring gases from the hood of the updraft firing zone to the hood of the drying zone and means for introducing a controlled supply of air into the gases so transferred.

19. Apparatus as defined in claim 15, including an updraft drying zone in advance of the first-mentioned drying zone and means for transferring gases from the windboxes in the downdraft heating and firing zone to the windboxes in the updraft drying zone.

20. Apparatus as defined in claim 15 wherein means is provided for introducing a controlled flow of air into the gases flowing from the cooler to the cooling zone.

(References on following page)

References Cited

UNITED STATES PATENTS

| | | | |
|---|---|---|---|
| 2,805,141 | 9/1957 | Apuli | 75—5 |
| 3,024,101 | 3/1962 | Erck, et al. | 75—5 |
| 3,172,754 | 3/1965 | Anthes et al. | 75—5 |
| 3,214,264 | 10/1965 | Von Bogdandy | 75—5 |
| 3,264,091 | 8/1966 | Ban | 75—5 |
| 3,264,092 | 8/1966 | Ban | 75—5 |

BENJAMIN HENKIN, *Primary Examiner.*